United States Patent [19]

Chen

[11] Patent Number: 5,063,770
[45] Date of Patent: Nov. 12, 1991

[54] CRIMPING TOOL

[76] Inventor: Ching-Jen Chen, No. 33-1, Luh-Tyi St., Panchiao City, Taipei Hsien, Taiwan

[21] Appl. No.: 545,814

[22] Filed: Jun. 29, 1990

[51] Int. Cl.⁵ .............................. B21D 7/06
[52] U.S. Cl. .......................... 72/410; 7/129; 81/421; 140/106; 140/123.6
[58] Field of Search .............. 72/409, 410, 416; 81/421, 422, 423; 140/105, 106, 121, 123.5, 123.6; 7/129, 130, 131, 132, 133, 134

[56] References Cited

U.S. PATENT DOCUMENTS

| | | | |
|---|---|---|---|
| 2,925,004 | 2/1960 | Broske et al. | 72/411 |
| 3,514,990 | 6/1970 | Bauknight et al. | 72/410 |
| 3,553,999 | 1/1971 | Rommel | 72/410 |
| 3,965,719 | 6/1976 | Hays | 72/410 |
| 4,048,877 | 9/1977 | Undin | 72/410 |
| 4,283,933 | 8/1981 | Wiener | 72/409 |
| 4,381,661 | 5/1983 | Wiener et al. | 72/409 |
| 4,829,805 | 5/1989 | Koehn | 72/410 |

Primary Examiner—Lowell A. Larson
Assistant Examiner—Thomas C. Schoeffler
Attorney, Agent, or Firm—Thomas R. Vigil

[57] ABSTRACT

A crimping tool includes an elongated first handle member, a pair of head plates pivoted to the front portion of the first handle member, and an elongated second handle member having a front portion pivoted on the head plates to allow movement of its rear portion away from and towards the rear portion of the first handle member. The second handle member has a curved toothed section formed on its front portion. A pawl member is resiliently mounted between the head plates and engages with the curved toothed section of the second handle member when the second handle member moves toward the first handle member. A first stripping plate is fixed on the middle of the first handle member and has one side formed with a plurality of first stripping grooves. The first handle member further has a rectangular opening adjacent to the first stripping plate and a plurality of second stripping grooves formed in the rectangular opening and aligned with the first stripping grooves. A second stripping plate is pivoted to both the first and second handle members and has one end with third stripping grooves that matches the stripping grooves of the first stripping plate. An extension spring has one end connected to the second stripping plate and another end connected to the first handle member.

7 Claims, 7 Drawing Sheets

CRIMPING TOOL

BACKGROUND OF THE INVENTION

The invention relates to a crimping tool, more particularly to a crimping tool having wire stripping features.

FIG. 1 is an illustration of a conventional crimping tool used to connect a conductor to a terminal device. During the crimping process, it is sometimes necessary to use a separate tool to strip the conductor of its outer sheathing, thus inconveniencing the user.

SUMMARY OF THE INVENTION

A main object of this invention is to provide a crimping tool having wire stripping features, thus making it unnecessary to use a separate tool to achieve the wire stripping function.

A second object of this invention is to provide a crimping tool with an adjustable jaw member so that the crimping tool may be used to crimp conductors of different gage specifications.

Accordingly, the preferred embodiment of a crimping tool of this invention comprises an elongated first handle member, a pair of head plates pivoted on the front portion of the first handle member, and an elongated second handle member having a front portion pivoted on the head plates to allow movement of its rear portion away from and towards the rear portion of the first handle member. A first jaw member is attached to the front portion of the first handle member while a second jaw member is attached between the head plates. The second handle member has a curved toothed section formed on its front portion. A pawl member is resiliently mounted between the head plates and engages the curved toothed section of the second handle member when the second handle member moves towards the first handle member.

A first stripping plate is fixed on the middle of the first handle member and has one side formed with a plurality of semi-circular first stripping grooves. The first handle member further has a rectangular opening adjacent to the first stripping plate and a plurality of second stripping grooves formed in the rectangular opening and aligned with the first stripping grooves. A second stripping plate is pivoted to both the first and second handle members and has one end with third stripping grooves that matches the first stripping grooves of the first stripping plate. An extension spring has one end connected to the second stripping plate and the other end connected to the first handle member. Movement of the rear portion of the second handle member away from or towards the rear portion of the first handle member correspondingly moves the second stripping plate away from or towards the first stripping plate.

In another aspect of the present invention, the first jaw member has an elongated notch to receive the front portion of the first handle member and a first crimping face formed opposite the elongated notch. The second jaw member is substantially T-shaped in cross-section and has a first web member with an oblongated first through hole and a clamping member with a second crimping face opening towards the first crimping face. The second jaw member is movably received in an adjusting seat fixed between the head plates. The adjusting seat has a substantially U-shaped seat portion and a second web abutting the first web member. The second web has a second through hole aligned with the oblongated first through hole. A knob portion of an adjusting piece abuts one of the head plates. The adjusting piece further includes a cylindrical pin portion extending into the second through hole and an eccentric portion extending into the oblongated first through hole. The oblongated first through hole is of a size which permits the rotation of the eccentric portion therein, thus permitting the eccentric portion to slightly move the second jaw member up and down relative to the adjusting seat, thereby adjusting the spacing between the first and second jaw members when the knob is rotated.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
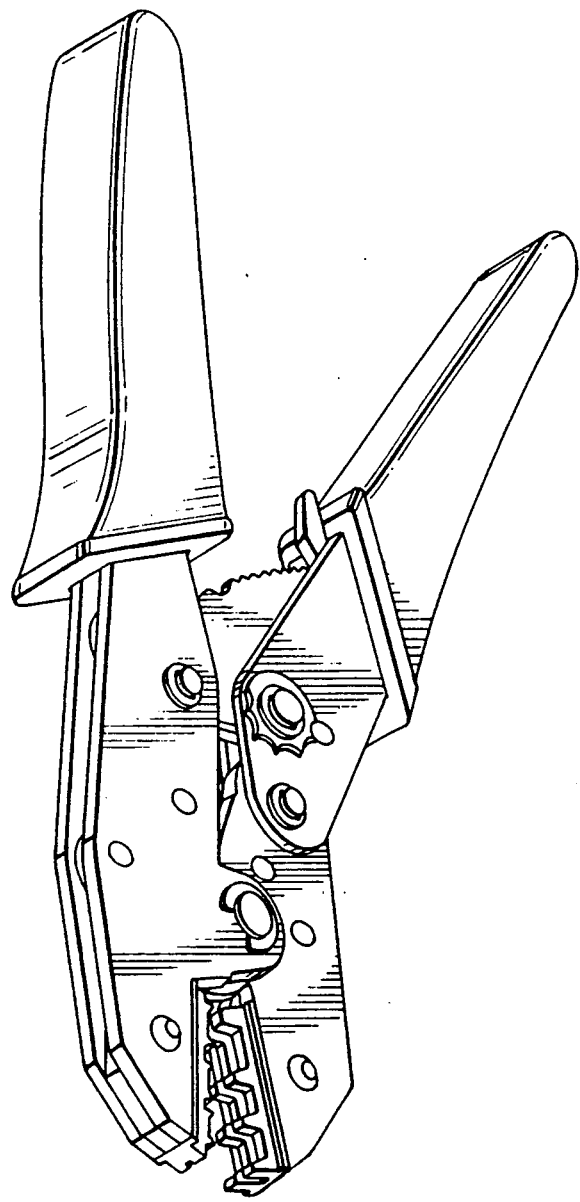
FIG. 1 is an illustration of a conventional crimping tool.
Figure 2:
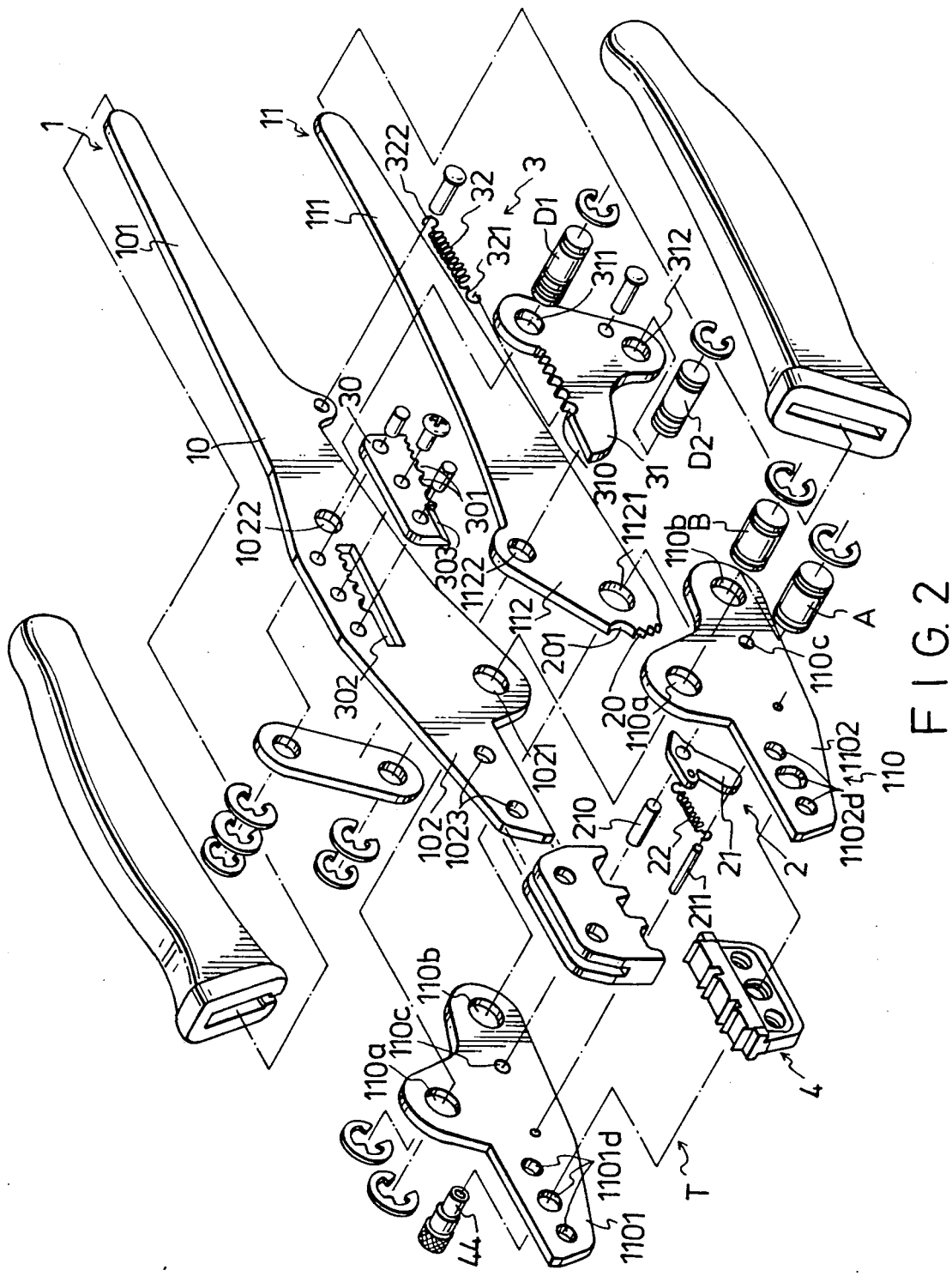
FIG. 2 is an exploded view of the preferred embodiment of a crimping tool according to the present invention.

Referring to FIG. 2, the preferred embodiment of a crimping tool according to this invention is shown to comprise a handle portion 1, a pawl member 2, a wire stripping means 3, and a crimping head 4. The handle portion 1 includes an elongated first handle member 10, an elongated second handle member 11, and a pair of head plates 1101 and 1102. The first handle member 10 has a pivot hole 1021 in a front portion 102. Each of the head plates 1101 and 1102 has a pivot hole 110a to be aligned with the pivot hole 1021 of the first handle member 10. A pivot pin member B passes through the pivot holes 1021 and 110a with the first handle member 10 being disposed between the head plates 1101 and 1102. The second handle member 11 similarly has a pivot hole 1121 in a front portion 112. Each of the head plates 1101 and 1102 further has a pivot hole 110b offset from the pivot hole 110a and to be aligned with the pivot hole 1121 of the second handle member 11. A pivot pin member A passes through the pivot holes 1121 and 110b with the second handle member 11 being disposed between the head plates 1101 and 1102. The second handle member 11 is thus hinged to move away from and towards the rear portion 101 of the first handle member 10.

The head plates 1101 and 1102 define a receiving space T for the pawl member 2. The front portion 112 of the second handle member 11 has a curved toothed section 20 with a notch 201. The pawl member 2 includes a pawl piece 21 disposed in the receiving space T and pivoted on the head plates 1101 and 1102 by a pin 210 passing through holes 110c. An extension spring 22 has one end fixed to the pawl piece 21 and the other end attached to a pin 211 fixed between the head plates 1101 and 1102. The pawl piece 21 engages the toothed section 20 of the second handle member 11 when the second handle member 11 is pressed towards the first handle member 10.

The wire stripping means 3 comprises a fixed stripping plate 30, a movable stripping plate 31, and an extension spring 32. The fixed stripping plate 30 is a substantially rectangular plate having one side formed with a plurality of semi-circular stripping grooves 301 of different diameters and a sharp cutting edge 303. The first handle member 10 has a rectangular opening 302 adjacent to the fixed stripping plate 30 and a plurality of semi-circular stripping grooves formed in the rectangular opening 302 and aligned with the stripping grooves 301 of the fixed stripping plate 30.

Figure 3:
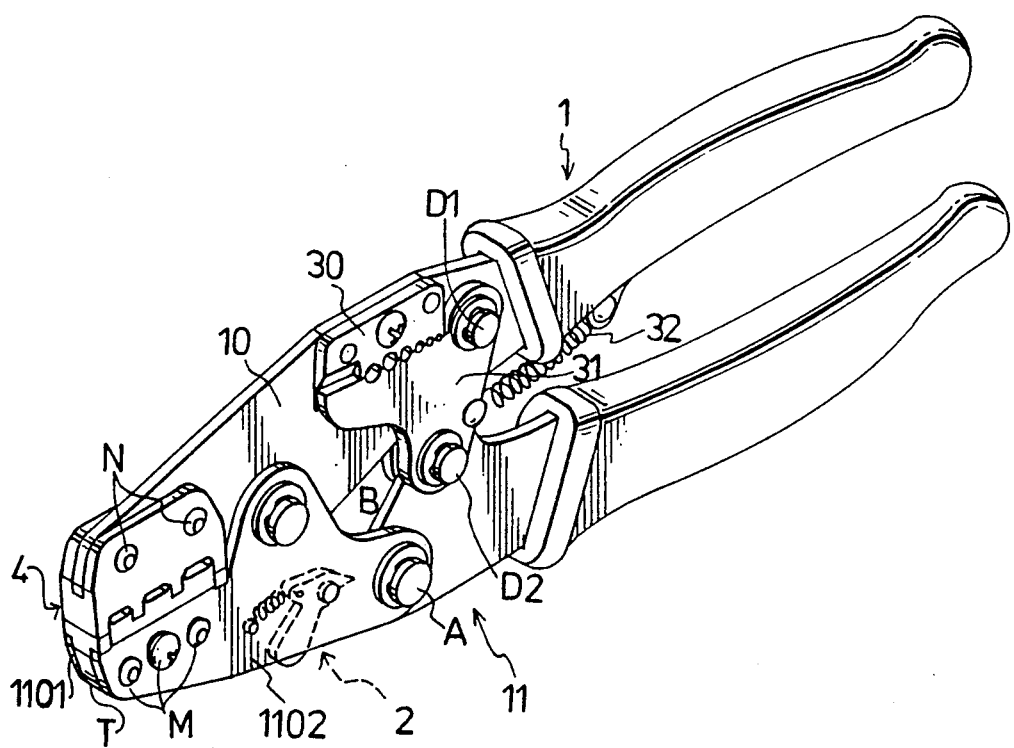
FIG. 3 is a perspective view of the preferred embodiment illustrating assembly.

The first handle member 10 has a pivot hole 1022 near the rectangular opening 302. The second handle member 11 has a pivot hole 1122 offset from the pivot hole 1121. The movable stripping plate 31 has pivot holes 311 and 312 to be aligned with the pivot holes 1022 and 1122, respectively. A pin D1 passes through the pivot holes 311 and 1022. A pin D2 passes through the pivot holes 312 and 1122. One end 310 of the movable stripping plate 31 has stripping grooves which match the stripping grooves 301 of the fixed stripping plate 30, to form a plurality of wire stripping openings (as shown in FIG. 3). The extension spring 32 has a first end 321 connected to the first handle member 10 and a second end 322 connected to the movable stripping plate 31 adjacent to the pivot hole 312.

Figure 4A:
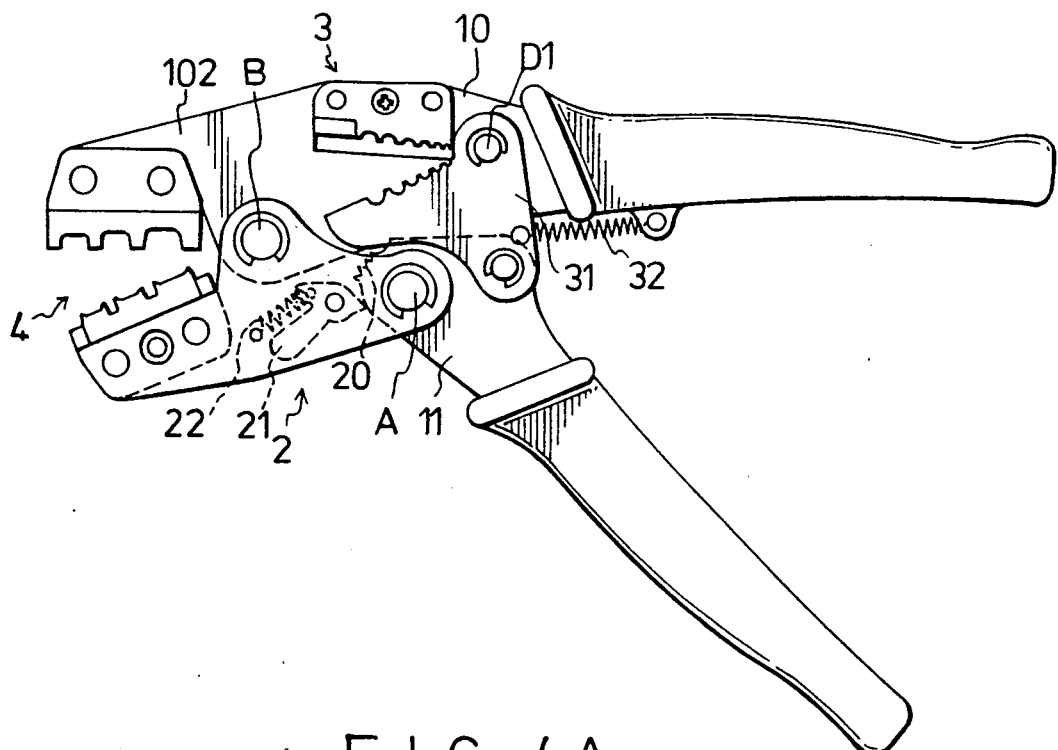
FIGS. 4A, 4B, 4C and 4D illustrate the preferred embodiment in various stages of operation.

The detailed operation of the preferred embodiment is as follows: The second handle member 11 is urged away from the first handle member 10 towards a position shown in FIG. 4A by the action of the extension spring 32. The extension spring 32 pulls the movable stripping plate 31 so that the movable stripping plate 31 pivots about pin D1 in a counterclockwise direction and moves away from the fixed stripping plate 30. The head plates 1101 and 1102 similarly pivot about pin B in a counterclockwise direction to move away from the front portion 102 of the first handle member 10. The pawl piece 21 is biased by the extension spring 22 to move away from the toothed section 20 of the second handle member 11.

Figure 4B:
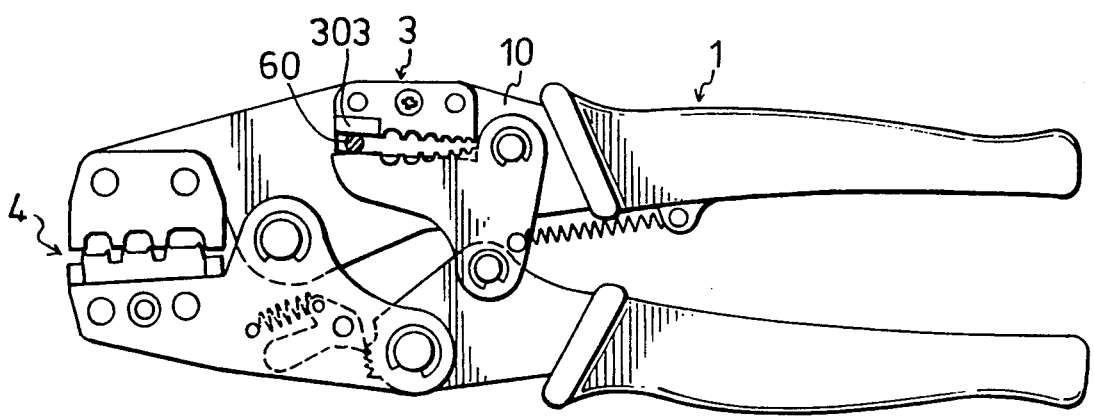
Figure 4C:
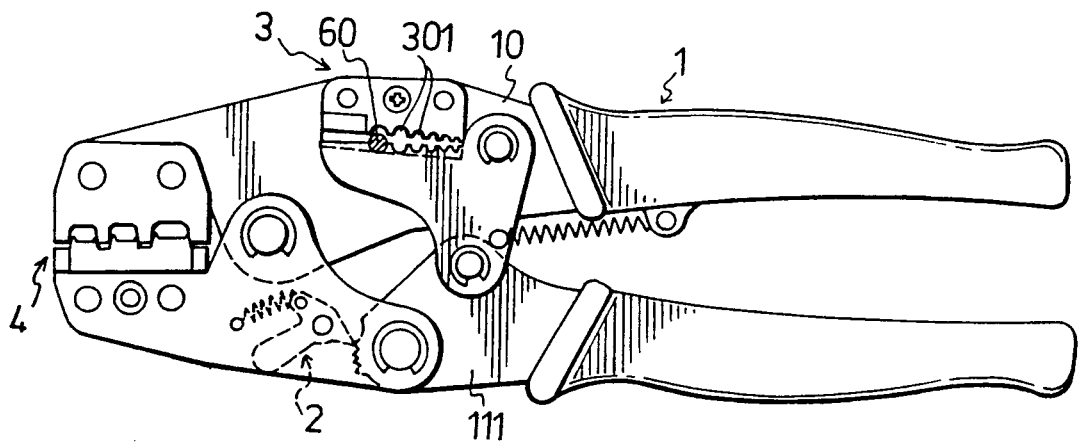

When the first and second handle members 10 and 11 are squeezed together, the front portion 112 of the second handle member 11 moves forward so that the movable stripping plate 31 pivots about pin D1 in a clockwise direction to move towards the fixed stripping plate 30. The head plates 1101 and 1102 similarly pivot about pin B in a clockwise direction to move towards the front portion 102 of the first handle member 10 to a crimping position. The pawl piece 21 then engages the curved toothed section 20 of the second handle member 11. A higher crimping pressure is thus provided at the crimping head 4 and the second handle member 11 is prevented from moving away from the first handle member 10. This action is shown in FIGS. 4B and 4C.

Figure 4D:
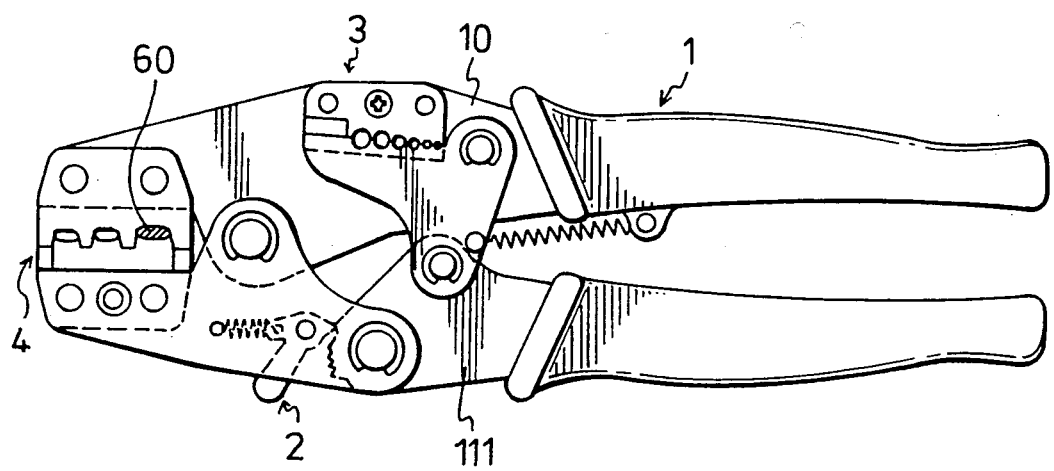

When sufficient squeezing force has been applied to the first and second handle members 10 and 11 to cause the pawl piece 21 to reach the notch 201 of the toothed section 20, as shown in FIG. 4D, the pawl piece 21 rotates past its teeth-engaging position, thus enabling the first and second handle members 10 and 11 to move away from each other.

Figure 5:
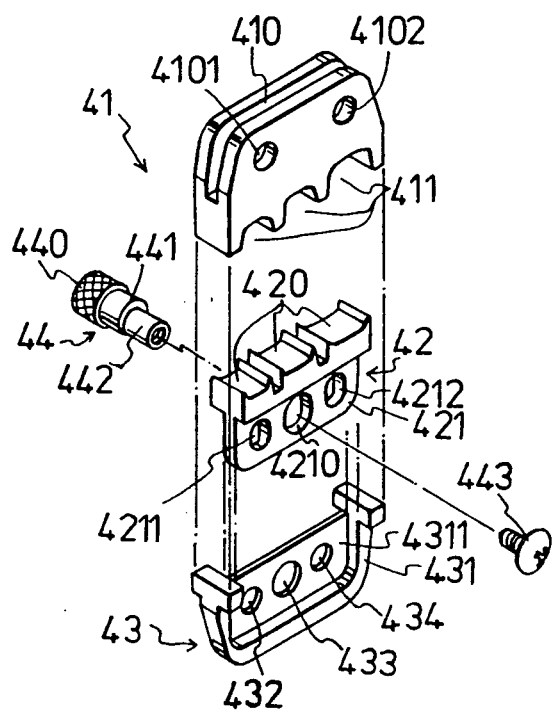
FIG. 5 is an exploded view of a crimping head of the preferred embodiment.

In another aspect of the preferred embodiment, with reference to FIGS. 2, 3 and 5, the crimping head 4 includes a first jaw member 41, a second jaw member 42, and an adjusting means 43. The front portion 102 of the first handle member 10 extends through an elongated notch 410 of the first jaw member 41 and is fixed thereat by fasteners N passing through mounting holes 4101 and 4102 of the first jaw member 41 and holes 1023 of the first handle member 10. The first jaw member 41 has three crimping grooves 411 of different depths on a crimping surface opposite to the elongated notch 410. The second jaw member 42 is substantially T-shaped and has a web member 421 and a clamping member 420 with a crimping surface that has three crimping grooves of different depths which open towards the crimping grooves 411. The web member 421 has three substantially oblongated holes 4210, 4211 and 4212, the central oblongated hole 4210 being the hole with the largest opening.

The adjusting means 43 has a substantially U-shaped adjusting seat portion 431 and a web member 4311. The web member 4311 has circular holes 432, 433, and 434 to be aligned with the oblongated holes 4210, 4211, and 4213, respectively. As with the web member 421, the central circular hole 433 has the largest opening. When assembled, the second jaw member 42 is movably received by the adjusting seat 431 with the web member 4311 abutting the web member 421. The adjusting seat 431 is fastened to the head plates 1101 and 1102 at the receiving space T by means of fastening members M passing through the circular and oblongated holes.

An adjusting piece 44 of the adjusting means 43 has a cylindrical pin portion 441, a coaxial knob portion 440 and an eccentric screw socket 442 extending from the cylindrical pin portion 441 opposite to the knob portion 440. When assembled, the knob portion 440 abuts the head plate 1101. The cylindrical pin portion 441 extends into one of the holes 1101d of the head plate 1101 and through the central circular hole 433. The eccentric screw socket 441 is disposed inside the central oblongated hole 4210. A headed screw 443 extends through one of the holes 1102d of the head plate 1102 and into the screw socket 441.

Figure 6A:
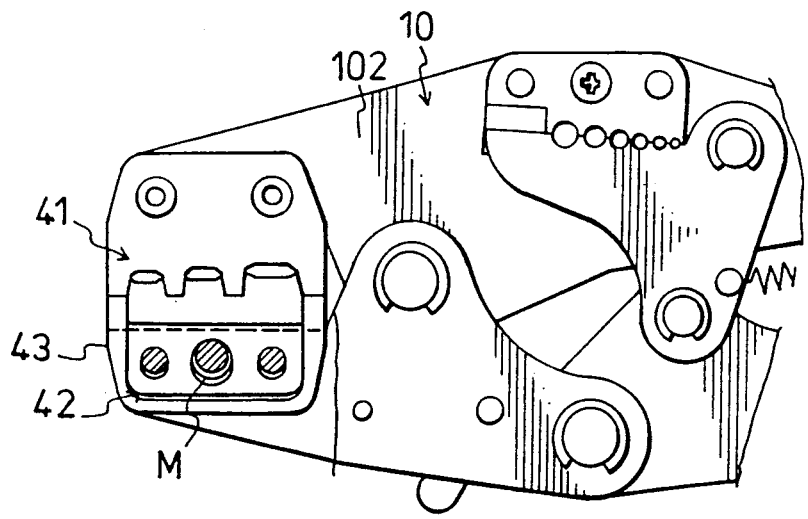
FIGS. 6A and 6B illustrate the assembled crimping head in different adjustment states.
Figure 6B:
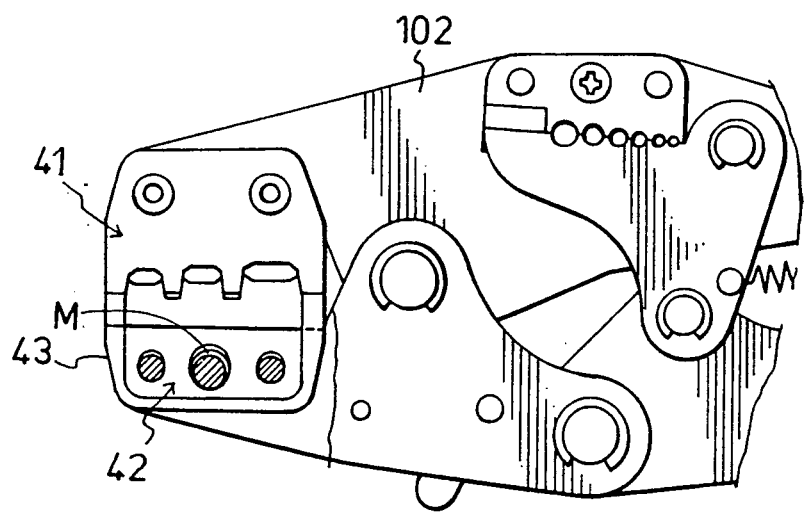

Referring to FIGS. 6A and 6B, when crimping electrical wires of different gage specifications, the knob portion 440 may be rotated so that the eccentric screw socket 442 may move the second jaw member 42 slightly up or down relative to the first jaw member 41, thus enabling the user to adjust the spacing between the first and second jaw members 41 and 42, so that the electrical wires may be tightly crimped. Therefore, the central oblongated hole 4210 must be of a size which permits the rotation of the eccentric screw socket 442 and at the same time, allows the eccentric screw socket 442 to contact the edges of the second jaw member 42 which confine the central oblongated hole 4210, thus enabling the eccentric screw socket 442 to affect the position of the second jaw member 42.

Once assembled, the preferred embodiment can be used to cut a piece of electrical wire 60 by placing it between the fixed stripping plate 30 and the movable stripping plate 31 at the cutting edge 303, as shown in FIG. 4B. The preferred embodiment can also be used to strip a length of electrical wire 60 by placing it in the appropriate stripping groove 301, as shown in FIG. 4C. The crimping function of the preferred embodiment is illustrated in FIG. 4D.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A crimping tool, comprising:

an elongated first handle member having a first front portion, a first middle portion and a first rear portion, said first front portion having a first pivot hole;

a pair of head plates pivoted on said first front portion for moving between a crimping position and a releasing position with respect to said first front portion, each of said head plates having a second pivot hole to be aligned with said first pivot hole and further having a third pivot hole offset from said second pivot hole, said first handle member being disposed between said head plates;

a first pivot pin member passing through said first and said second pivot holes;

an elongated second handle member having a second front middle portion and a second rear portion, said second handle member being pivoted on said head plates at said second front middle portion to allow movement of said second rear portion away from an towards said first rear portion of said first handle member, said second handle member being disposed between said head plates, said second handle member having a fourth pivot hole to be aligned with said third pivot hole, said second handle member offset from said fourth pivot hole, said second handle member further having a curved tooth section formed on said second, front middle portion adjacent to said fourth pivot hole;

a second pivot pin member passing through said third and said fourth pivot holes;

a first jaw member attached to said front portion of said first handle member;

a second jaw member attached between said head plates;

a pawl member resiliently mounted between said head plates and engaging said curved toothed section of said second handle member when said second handle member moves toward said first handle member;

said pawl member being biased by a pawl extension spring being connected on one end to said pawl member and another end connected to a pin located between said head plates;

a first stripping plate fixed to said first handle member between said first front and in said rear first middle portions, said first stripping plate having one side formed with a plurality of first stripping grooves;

said first handle member further having a rectangular opening in said first middle portion adjacent to said first stripping plate, a plurality of second stripping grooves formed in said rectangular opening and aligned with said first stripping grooves, and a sixth pivot hole near said rectangular opening;

a second stripping plate pivoted to said second handle member at said fifth pivot hole and to said first handle member at said sixth pivot hole, said second stripping plate having one end with third stripping grooves which matches said first stripping grooves of said first stripping plate; and an extension spring having one end connected to said second stripping plate adjacent to said fifth pivot hole and another end connected to said first handle member.

2. The crimping tool as claimed in claim 1, wherein said first, said second and said third stripping grooves are semi-circular grooves of different diameters.

3. The crimping tool as claimed in claim 1, wherein said first stripping plate further includes a sharp cutting edge adjacent said first stripping grooves.

4. The crimping tool as claimed in claim 1, wherein said first jaw member has an elongated notch to receive said front portion of said first handle member and a first crimping face opposite said elongated notch.

5. The crimping tool as claimed in claim 4, wherein said second jaw member has a first web member with an oblongated first through hole, and a clamping member with a second crimping face opening towards said first crimping face; said crimping tool further comprising:

an adjusting seat fixed between said head plates and having a substantially U-shaped seat portion and a second web abutting said first web member, said second web having a second through hole to be aligned with said oblongated first through hole, said second jaw member being movably received in said adjusting seat; and an adjusting piece having a cylindrical pin portion, a coaxial knob portion and an eccentric portion opposite to said knob portion, said knob portion abutting one of said head plates, said cylindrical pin portion extending into said second through hole, said eccentric portion extending into said oblongated first through hole, said oblongated first through hole being of a size which permits the rotation of said eccentric portion therein, said eccentric portion slightly moving said second jaw member up or down relative to said adjusting seat, thus adjusting the spacing between said first and said second jaw members when said knob portion is rotated.

6. The crimping tool as claimed in claim 5, wherein said second jaw member is substantially T-shaped in cross section.

7. The crimping tool as claimed in claim 6, wherein said eccentric portion has a screw socket to receive a headed screw which passes through the other one of said head plates opposite said knob portion.

* * * * *

UNITED STATES PATENT AND TRADEMARK OFFICE
CERTIFICATE OF CORRECTION

PATENT NO. : 5,063,770
DATED : November 12, 1991
INVENTOR(S) : Ching-Jen Chen It is certified that error appears in the above-identified patent and that said Letters Patent is hereby corrected as shown below:

Column 5, line 29 "pivot hole," should be --pivot holes and a fifth pivot hole offset from said fourth pivot hole,--.

Signed and Sealed this

Eleventh Day of January, 1994

Attest:

BRUCE LEHMAN

*Attesting Officer*     *Commissioner of Patents and Trademarks*